D. H. GRIGG.
SPRING WHEEL.
APPLICATION FILED APR. 18, 1916.

1,212,208. Patented Jan. 16, 1917.

Witnesses
James F. Crown
N. M. Feet

Inventor
D. H. Grigg
By Chandler & Chandler
Attorneys

UNITED STATES PATENT OFFICE.

DAVID H. GRIGG, OF CLOVERDALE, BRITISH COLUMBIA, CANADA.

SPRING-WHEEL.

1,212,208.  Specification of Letters Patent.  Patented Jan. 16, 1917.

Application filed April 18, 1916. Serial No. 91,975.

*To all whom it may concern:*

Be it known that I, DAVID H. GRIGG, a citizen of the Dominion of Canada, residing at Cloverdale, in the Province of British Columbia, Dominion of Canada, have invented certain new and useful Improvements in Spring-Wheels; and I do hereby declare the following to be a full, clear, and exact description of the invention, such as will enable others skilled in the art to which it appertains to make and use the same.

This invention relates to improvements in wheels, and particularly to spring wheels.

One object of the present invention is to provide a simple and efficient device of this character which possesses the resiliency equivalent to a pneumatic tire, but without the undesirable puncturability of the latter.

Another object is to provide a wheel of this character which is of such construction that the parts can be quickly and conveniently removed for adjustment and repair.

Other objects and advantages will be apparent from the following description when taken in connection with the accompanying drawing.

Figure 1:
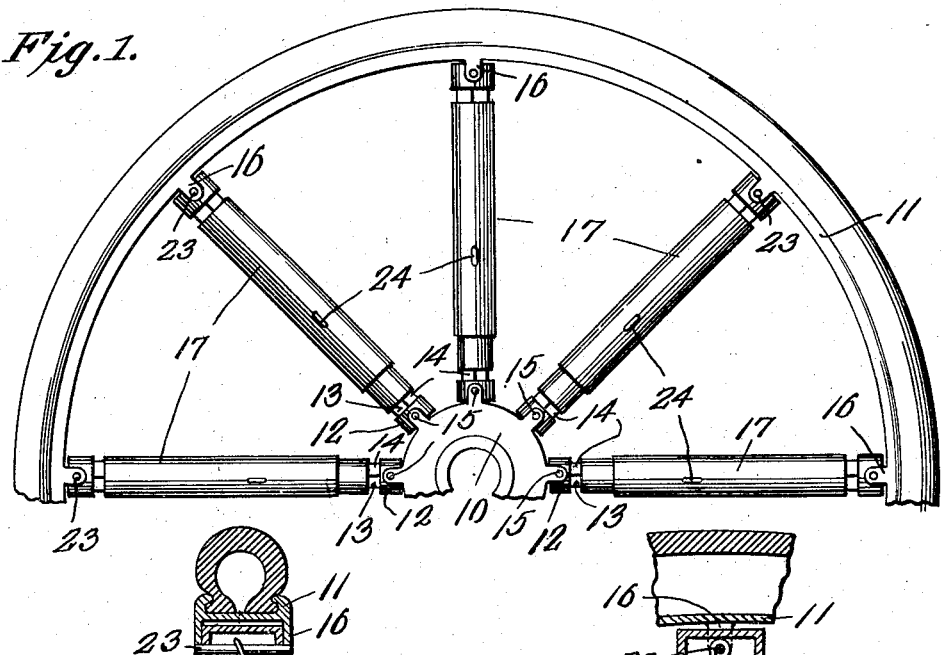
Figure 2:
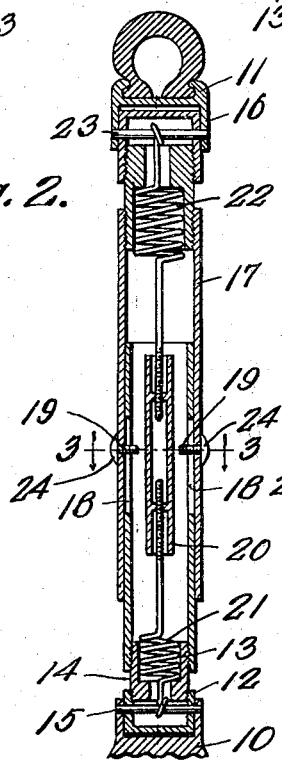
Figure 3:
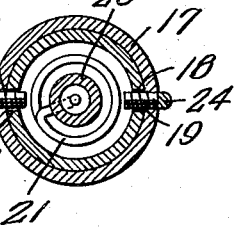
Figure 4:
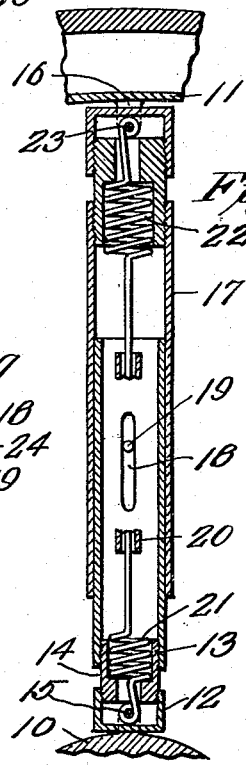

In the drawing: Figure 1 is a side elevation of a portion of a wheel made in accordance with my invention. Fig. 2 is a vertical sectional view. Fig. 3 is a transverse sectional view on the line 3—3 of Fig. 2. Fig. 4 is a vertical sectional view taken in a plane at right angles to that of Fig. 2.

Referring particularly to the accompanying drawing, 10 represents the hub, and 11 the rim of a wheel, in connection with which my improved spring spokes are used.

The hub is formed with a plurality of socket members 12 which are interiorly threaded to receive the exteriorly threaded ends of the tubular members 13. The portions of the tubular members 13, outwardly of the socket members are formed with the wrench engaging faces 14. The before-mentioned socket members are secured within the hub by means of the transverse bolts or pins 15, so that said members will have a limited swinging movement at the sides of the wheel while the upper and lower spokes are brought into action, as will be more clearly brought out hereinafter.

The rim is provided with the apertured ears 16 between which are pivotally secured the tubular members 17, said members having their other ends telescoped onto the outer ends of the other tubular members 13. In the outer tubular member 17 are formed the openings which register with the longitudinal slots 18 in the corresponding portion of the inner tubular member, and through these openings and slots there is disposed a bolt 19, said bolt permitting telescopic action between the tubular members, while at the same time preventing relative rotation of said members.

Within the inner tubular member, is a smaller tubular member 20. A pair of coil springs 21 and 22, have their inner ends threaded and secured in the ends of the tubular member 20, while their outer ends are secured in the socket members of the hub and rim, by means of the bolts 15 and 23, the latter of said bolts being disposed through the socket 16 and the tubular member 17. It will thus be seen that when the hub moves downwardly under the weight of a load, the springs of the lowermost spoke will be compressed while those of the uppermost spoke are stretched. The spokes at the sides of the wheel will have a limited pivotal movement on the bolts 15 to prevent strain on the said spokes.

The device is of simple construction, and is effective to produce an amount of resiliency practically equivalent, if not greater than the pneumatic tire.

By means of the wrench engaging faces 14 the spoke can be quickly and easily taken from the wheel for adjustment or repair, without disturbing the other spokes. The bolt 19 is provided on its opposite ends with cap nuts 24 which enter the openings of the outer tubular member, and prevent wear of the bolt.

What is claimed is:

The combination of a wheel hub and rim; of oppositely disposed spaced ears formed on said hub and rim, cup-shaped socket members mounted between said ears, pivot pins passing through said ears and socket members to pivotally connect the ears and sockets, hollow spring seats screwed into said socket members, said spring seats being provided with openings therethrough, spoke sections secured to said spring seats and telescopically connected, springs mounted in said spring seats and having ends passing through the openings in the seats and connected to said pivots, the remaining ends of said springs being directed toward each other in alinement and threaded, and a turn buckle sleeve screwed on the said remaining end of the spring.

In testimony whereof, I affix my signature, in the presence of two witnesses.

DAVID H. GRIGG.

Witnesses:
O. L. TAYLOR,
E. B. SMITH.

Copies of this patent may be obtained for five cents each, by addressing the "Commissioner of Patents, Washington, D. C."